US010862965B2

(12) United States Patent
Falco et al.

(10) Patent No.: US 10,862,965 B2
(45) Date of Patent: Dec. 8, 2020

(54) SYSTEM AND METHOD FOR TOPICS IMPLEMENTATION IN A DISTRIBUTED DATA COMPUTING ENVIRONMENT

(71) Applicant: ORACLE INTERNATIONAL CORPORATION, Redwood Shores, CA (US)

(72) Inventors: Mark Falco, Burlington, MA (US); Brian Oliver, Burlington, MA (US); Jonathan Knight, Istanbul (TR)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 16/148,103

(22) Filed: Oct. 1, 2018

(65) Prior Publication Data
US 2019/0104179 A1   Apr. 4, 2019

Related U.S. Application Data

(60) Provisional application No. 62/566,443, filed on Oct. 1, 2017.

(51) Int. Cl.
*G06F 15/16* (2006.01)
*H04L 29/08* (2006.01)
*G06F 12/02* (2006.01)

(52) U.S. Cl.
CPC ...... *H04L 67/1097* (2013.01); *G06F 12/0253* (2013.01); *H04L 67/26* (2013.01); *H04L 67/2842* (2013.01); *G06F 2212/1044* (2013.01); *H04L 67/02* (2013.01)

(58) Field of Classification Search
CPC . H04L 67/1097; H04L 67/26; H04L 67/2842; G06F 12/0253
USPC .................. 709/217, 201; 711/129
See application file for complete search history.

(56) References Cited

U.S. PATENT DOCUMENTS

| 5,784,569 | A | | 7/1998 | Miller |
| 5,819,272 | A | | 10/1998 | Benson |
| 5,933,818 | A | | 8/1999 | Kasravi |
| 5,935,211 | A | * | 8/1999 | Osterman ............... G06F 9/542 |
| | | | | 709/228 |
| 5,940,367 | A | | 8/1999 | Antonov |
| 5,991,894 | A | | 11/1999 | Lee |

(Continued)

FOREIGN PATENT DOCUMENTS

EP     0928089 A2    7/1999

OTHER PUBLICATIONS

European Patent Office, International Searching Authority, International Search Report and Written Opinion dated Jan. 12, 2016 for International Application No. PCT/US2015/052060, 14 pages.

(Continued)

*Primary Examiner* — David R Lazaro
*Assistant Examiner* — Mariegeorges A Henry
(74) *Attorney, Agent, or Firm* — Tucker Ellis LLP

(57) ABSTRACT

A system and method for providing store and forward messaging on a partitioned cache provided by a distributed data grid. The store and forward message system implements publish and subscribe semantics in a way that distributed messages over the partitions of the distributed cache, reduces contention and makes efficient use of processor and network resources.

20 Claims, 7 Drawing Sheets

(56) References Cited

U.S. PATENT DOCUMENTS

| | | | |
|---|---|---|---|
| 5,999,712 | A | 12/1999 | Moiin |
| 6,078,930 | A | 6/2000 | Lee |
| 6,453,426 | B1 | 9/2002 | Gamache |
| 6,487,622 | B1 | 11/2002 | Coskrey |
| 6,553,389 | B1 | 4/2003 | Golding |
| 6,605,120 | B1 | 8/2003 | Fields |
| 6,693,874 | B1 | 2/2004 | Shaffer |
| 6,871,222 | B1 | 3/2005 | Frank |
| 6,952,758 | B2 | 10/2005 | Chron |
| 7,020,695 | B1 | 3/2006 | Kundu |
| 7,139,925 | B2 | 11/2006 | Dinker |
| 7,260,698 | B2 | 8/2007 | Hepkin |
| 7,376,953 | B2 | 5/2008 | Togasaki |
| 7,451,359 | B1 | 11/2008 | Coekaerts |
| 7,464,378 | B1 | 12/2008 | Lmaye |
| 7,543,046 | B1 | 6/2009 | Bae |
| 7,613,774 | B1 | 11/2009 | Caronni |
| 7,640,339 | B1 | 12/2009 | Caronni |
| 7,698,390 | B1 | 4/2010 | Harkness |
| 7,720,971 | B2 | 5/2010 | Moutafov |
| 7,739,677 | B1 | 9/2010 | Kekre |
| 7,792,977 | B1 | 9/2010 | Brower |
| 7,814,248 | B2 | 10/2010 | Fong |
| 7,882,067 | B2 | 2/2011 | Saika |
| 7,953,861 | B2 | 5/2011 | Yardley |
| 7,975,288 | B2 | 7/2011 | Viavant |
| 7,979,457 | B1 | 7/2011 | Garman |
| 8,209,307 | B2 | 6/2012 | Erofeev |
| 8,312,439 | B2 | 11/2012 | Kielstra |
| 8,397,227 | B2 | 3/2013 | Fan |
| 8,402,464 | B2 | 3/2013 | Dice |
| 8,595,714 | B1 | 11/2013 | Hamer |
| 9,135,268 | B2 | 9/2015 | Dash |
| 9,609,060 | B2 | 3/2017 | Kan |
| 9,843,551 | B2 * | 12/2017 | Milyakov ............... H04L 69/28 |
| 2002/0035559 | A1 | 3/2002 | Crowe |
| 2002/0042693 | A1 | 4/2002 | Kampe |
| 2002/0078312 | A1 | 6/2002 | Wang-Knop |
| 2003/0120715 | A1 | 6/2003 | Johnson |
| 2003/0135476 | A1 | 7/2003 | Holland |
| 2003/0187927 | A1 | 10/2003 | Winchell |
| 2004/0059805 | A1 | 3/2004 | Dinker |
| 2004/0153558 | A1 | 8/2004 | Gunduc |
| 2004/0153615 | A1 | 8/2004 | Koning |
| 2004/0176968 | A1 | 9/2004 | Syed |
| 2004/0179471 | A1 | 9/2004 | Mekkittikul |
| 2004/0205148 | A1 | 10/2004 | Bae |
| 2004/0236725 | A1 * | 11/2004 | Amitay ............... G06F 16/3338 |
| 2004/0267897 | A1 | 12/2004 | Hill |
| 2005/0021690 | A1 | 1/2005 | Peddada |
| 2005/0021737 | A1 | 1/2005 | Ellison |
| 2005/0028139 | A1 | 2/2005 | Togahara |
| 2005/0083834 | A1 | 4/2005 | Dunagan |
| 2005/0160315 | A1 | 7/2005 | Chandrasekaran |
| 2005/0193392 | A1 | 9/2005 | Carusi |
| 2005/0257217 | A1 | 11/2005 | Woollen |
| 2006/0048020 | A1 | 3/2006 | Newport |
| 2007/0016822 | A1 | 1/2007 | Rao |
| 2007/0118693 | A1 | 5/2007 | Brannon |
| 2007/0124348 | A1 | 5/2007 | Claborn |
| 2007/0140110 | A1 | 6/2007 | Kaler |
| 2007/0174160 | A1 | 7/2007 | Solberg |
| 2007/0198700 | A1 | 8/2007 | Vivian |
| 2007/0237072 | A1 | 10/2007 | Scholl |
| 2007/0271584 | A1 | 11/2007 | Anderson |
| 2008/0077622 | A1 | 3/2008 | Keith |
| 2008/0133531 | A1 | 6/2008 | Baskerville |
| 2008/0141336 | A1 | 6/2008 | Haller |
| 2008/0183876 | A1 | 7/2008 | Duvur |
| 2008/0184201 | A1 | 7/2008 | Burns |
| 2008/0276231 | A1 | 11/2008 | Huang |
| 2008/0281959 | A1 | 11/2008 | Robertson |
| 2008/0313293 | A1 | 12/2008 | Jacobs |
| 2009/0144714 | A1 | 6/2009 | Fan |
| 2009/0177914 | A1 | 7/2009 | Winchell |
| 2009/0228321 | A1 | 9/2009 | Srinivasan |
| 2009/0265449 | A1 | 10/2009 | Krishnappa |
| 2009/0320005 | A1 | 12/2009 | Toub |
| 2010/0064341 | A1 | 3/2010 | Aldera |
| 2010/0128732 | A1 | 5/2010 | Jiang |
| 2010/0174802 | A1 | 7/2010 | Chan |
| 2010/0250321 | A1 | 9/2010 | Farrell |
| 2010/0268571 | A1 | 10/2010 | Davies |
| 2010/0268749 | A1 | 10/2010 | Seitz |
| 2010/0312861 | A1 | 12/2010 | Kolhi |
| 2011/0041006 | A1 | 2/2011 | Fowler |
| 2011/0071981 | A1 | 3/2011 | Ghosh |
| 2011/0072217 | A1 | 3/2011 | Hoang |
| 2011/0107135 | A1 | 5/2011 | Andrews |
| 2011/0131663 | A1 | 6/2011 | Kaikuranta |
| 2011/0161289 | A1 | 6/2011 | Pei |
| 2011/0179231 | A1 | 7/2011 | Roush |
| 2011/0249552 | A1 | 10/2011 | Stokes |
| 2011/0252192 | A1 | 10/2011 | Busch |
| 2012/0117157 | A1 | 5/2012 | Ristock |
| 2012/0158650 | A1 | 6/2012 | Andre |
| 2012/0191642 | A1 | 7/2012 | George |
| 2012/0198455 | A1 | 8/2012 | Lee |
| 2012/0215740 | A1 | 8/2012 | Vaillant |
| 2012/0254118 | A1 | 10/2012 | Shah |
| 2012/0297056 | A1 | 11/2012 | Lee |
| 2013/0036427 | A1 * | 2/2013 | Chen ............... G06F 9/546 719/312 |
| 2013/0047165 | A1 | 2/2013 | Goetz |
| 2013/0332676 | A1 * | 12/2013 | Kotla ............... G06F 12/0848 711/129 |
| 2014/0149698 | A1 | 5/2014 | Ezra |
| 2015/0058293 | A1 | 2/2015 | Kobayashi |
| 2019/0013992 | A1 * | 1/2019 | Schuhart ............... G06Q 10/06 |

OTHER PUBLICATIONS

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

Oracle®, Oracle® Database, JDBC Developer's Guide 12c Release 1 (12.1), Jun. 2014, Copyright © 1999, 2014, 520 pages.

* cited by examiner

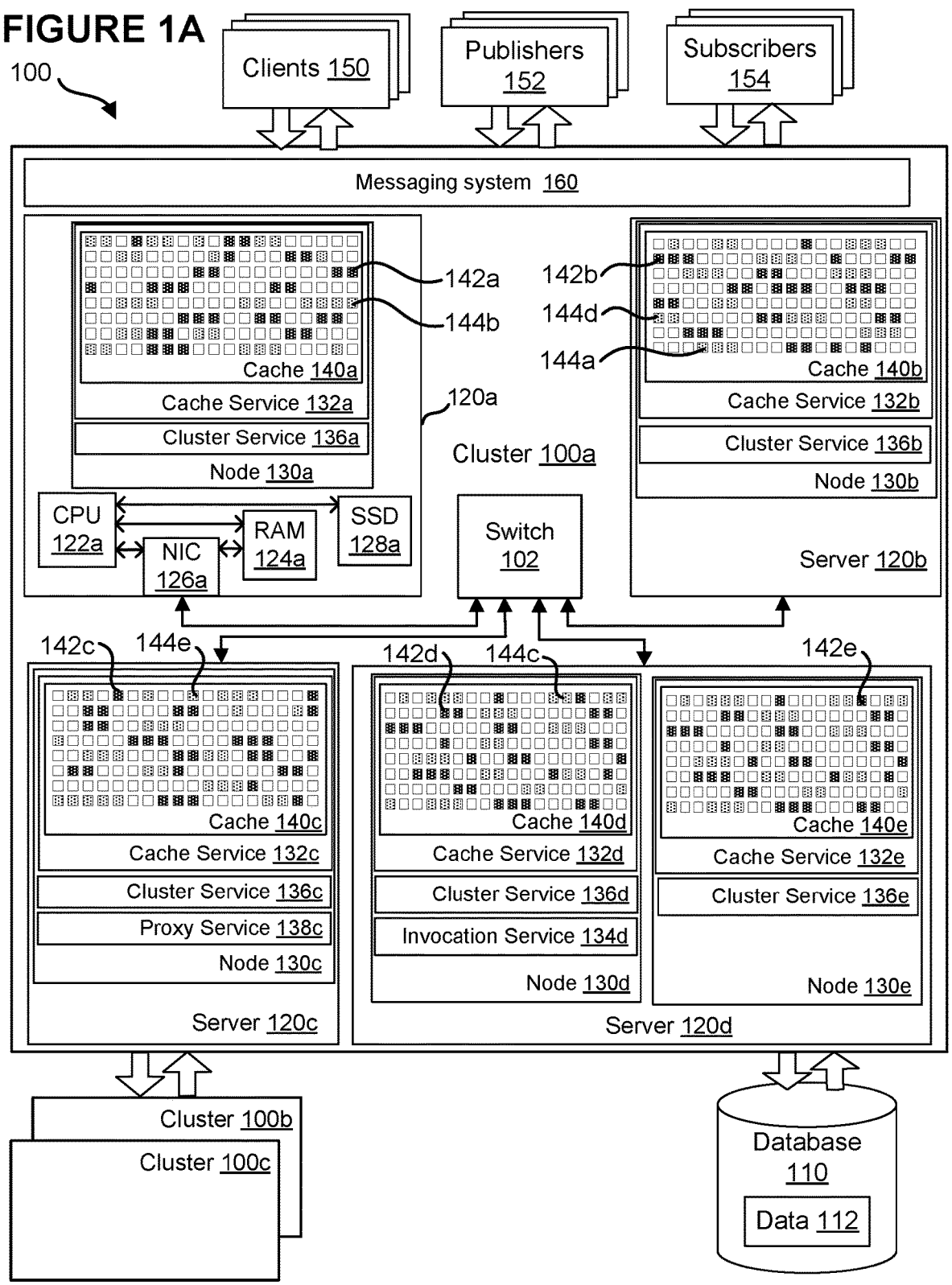

SYSTEM AND METHOD FOR TOPICS IMPLEMENTATION IN A DISTRIBUTED DATA COMPUTING ENVIRONMENT

CLAIM OF PRIORITY

This application claims the benefit of priority to U.S. Provisional Application titled "SYSTEM AND METHOD FOR TOPICS IMPLEMENTATION IN A DISTRIBUTED DATA COMPUTING ENVIRONMENT", Application No. 62/566,443, filed Oct. 1, 2017, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to implementation of a messaging system on a distributed computing environment.

SUMMARY

Described herein are systems and methods that can support implementation of a messaging system in a distributed computing environment. In particular, the present disclosure describes an implementation of a topics messaging model in a distributed computing environment such as a distributed data grid. Topics implement publish and subscribe semantics. Publishers add messages to a topic. Subscribers read messages from the topic. When a message is published it will be received by all the subscribers who are interested it. The messages can be specified to have some particular relative ordering. Accordingly, messages must be stored in an ordered fashion in the messaging system until all interested subscribers have received the message.

A distributed data grid can be viewed as implementing a key/value store which spans a cluster of nodes. While ideal for storing and retrieving values based on keys, the objects of a key value store do not have an inherent ordering. While key/value objects can be arranged as a linked list to implement a queue, difficulties arise in maintaining order of the list if the queue is distributed across multiple nodes in a cluster. Limiting the linked list to a single node, while solving the ordering problem, fails to use the distributed processing power and memory of the distributed data grid. Moreover, multiple publishers contend to publish messages to the list and multiple subscribers contend to read data from the list. Such contention can further degrade performance of a simple linked list to implement messaging on a distributed data grid.

Accordingly it is an object of the present invention to provide a messaging system implementation suitable for execution on a distributed computing environment such as a distributed data grid. Further, it is an object of the present invention to provide a messaging system implementation suitable for execution on a distributed data grid which is fault-tolerant and provides for data reliability, accuracy, consistency, high availability, and disaster recovery while satisfying all messaging requirements.

These and other objects and advantages of the present invention will become apparent to those skilled in the art from the following description of the various embodiments, when read in light of the accompanying drawings.

BRIEF DESCRIPTION OF THE FIGURES

FIG. 1A illustrates a messaging system implemented in a distributed computing environment according to an embodiment.

DETAILED DESCRIPTION

Figure 1B:
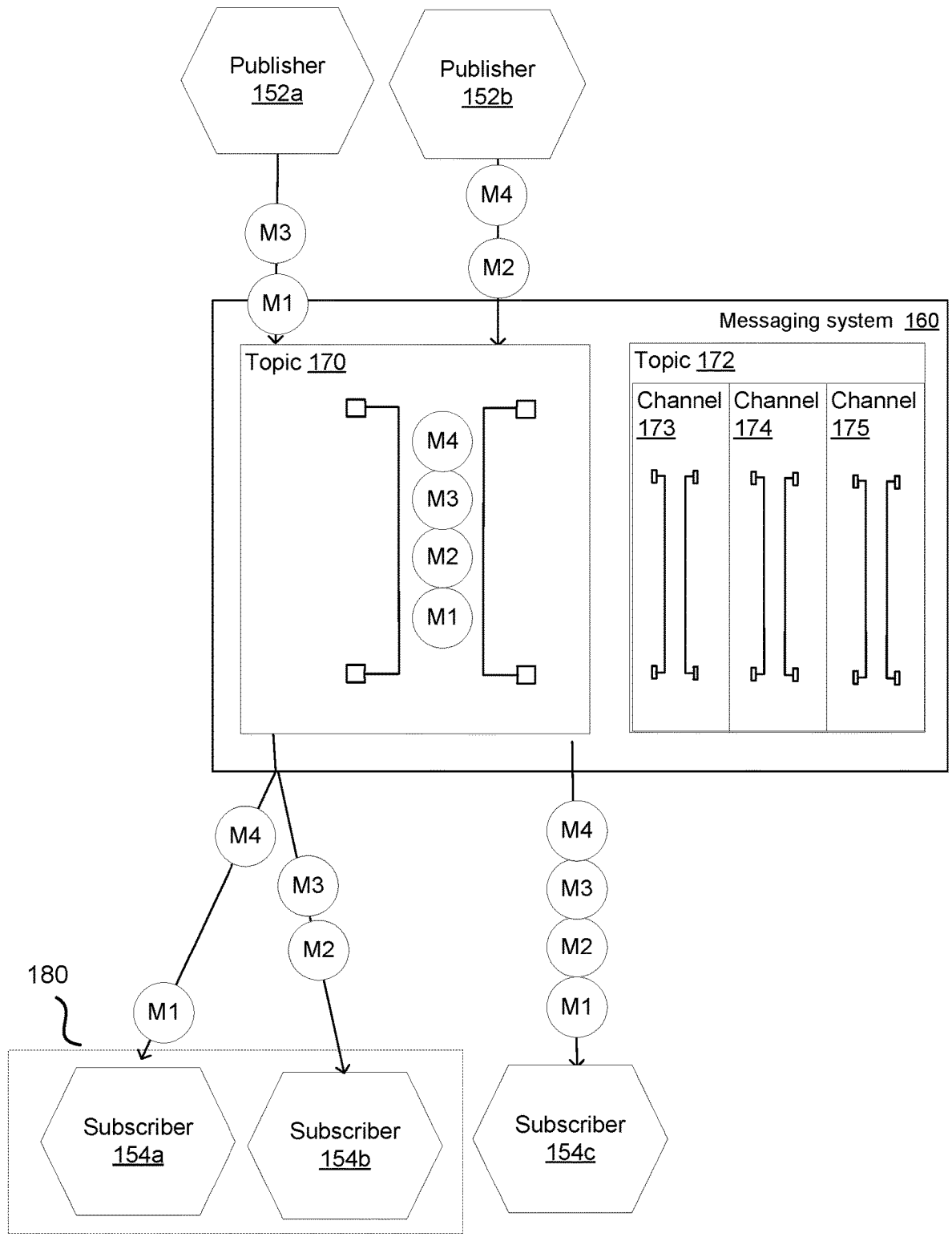
FIG. 1B illustrates topics functionality in a messaging system implemented in a distributed computing environment according to an embodiment.

The present disclosure describes an implementation of topics using publish and subscribe semantics in a distributed data grid. Messages are stored on multiple nodes of the distributed data grid, maintained in an ordered fashion in the messaging system until all interested subscribers have received the message. Additionally contention is reduced with respect to publishing messages to the distributed data grid and reading messages from the distributed data grid.

Described herein are systems and methods that can support implementation of a topics-based store and forward messaging system in a distributed data grid. The system and method for supporting messaging as described herein have particular utility in the distributed data grid described below with respect to FIG. 1A. The messaging system and/or aspects thereof disclosed herein may also be applied in wide variety of distributed key value stores and other distributed processing environments.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Computing Environment

A distributed computing environment such as a data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the messaging systems and methods described herein may be practiced in a distributed computing environment without these specific details. Thus, a particular implementation of a messaging system and method deployed on in a distributed computing environment embodying the present invention can, in some embodiments, exclude certain features, and/or include different, or modified features than those of the distributed data grid described below, without departing from the scope of the invention.

FIG. 1A illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1A, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1A. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid. Agents allows for execution of code/functions on nodes of the distributed data grid (typically the same node as data required for execution of the function is required). Distributed execution of code, such as agents, on the nodes of the cluster allows the distributed data grid to operate as a distributed computing environment.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1A, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access these data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/ value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments of the present invention, the distributed data grid 100 of FIG. 1A implements a messaging system 160 which stores ordered messages within the caches 140a, 140b, 140c, 140d, and 140e utilizing cache services 132a, 132b, 132c, 132d, 132e. In particular, the messaging system 160 implements topics in the distributed data grid 100. Topics implements publish and subscribe semantics. Publishers 152 add messages to a topic. The messages can be specified to have some particular relative ordering. Subscribers 154 read messages from the topic. When a message is published it will be received by all the subscribers 154 who are interested it. Messages must be durably stored in an ordered fashion in the messaging system 160 implemented on distributed data grid 100 and not deleted until all interested subscribers have received the message.

In a messaging system such as messaging system 160, information is transmitted between clients (where a client is defined as a running instance of an application) in the form of messages. From the sending client, producers send messages to a destination. On the receiving client, consumers retrieve messages from a destination. A destination is a type of named resource that resides within the messaging system. It is a repository for messages. Queues and topics are types of destinations to which messages can be sent. Messaging system 160 stores messages as data in the distributed data grid 100 thereby providing a messaging functionality not previously provided and while making use of the data reliability, scalability and failover properties of the distributed data grid 100.

In messaging system 160, messages sent to a queue are received by one and only one consumer. A message sent to a queue is kept on the queue until the message is received by a client or until the message expires. This style of messaging, in which every message sent is successfully processed by at most one consumer, is known as point-to-point. In messaging system 160, messages sent to a topic can be received by multiple consumers or none. This style of messaging, in which each message can be processed by any number of consumers (or none at all), is known as publish/subscribe. To receive a message sent to a topic, a consumer that subscribes to the topic (the subscriber) must be connected to the topic when the message is sent by the producer (the publisher). That is, only clients that have a consumer connected to a topic will receive messages sent to that topic. If there are no consumers on the topic, messages sent to the topic will not be received by anyone, unless there are some durable subscriptions on the topic.

To put it another way, publish-subscribe is a messaging pattern where senders of messages, called publishers, do not program the messages to be sent directly to specific receivers, but instead categorize published messages into topics without knowledge of which subscribers, if any, there may be. Similarly, subscribers express interest in one or more topics and only receive messages that are of interest, without knowledge of which publishers, if any, there are. In the publish-subscribe model, subscribers typically receive only a subset of the total messages published. The process of selecting messages for reception and processing is called filtering. There are two common forms of filtering: topic-based and content-based. In a topic-based system, messages are published to "topics" which are named logical channels. Subscribers in a topic-based system will receive all messages published to the topics to which they subscribe, and all subscribers to a topic will receive the same messages. The publisher is responsible for defining the classes of messages to which subscribers can subscribe. In a content-based system, messages are only delivered to a subscriber if the attributes or content of those messages matches constraints defined by the subscriber. The subscriber is responsible for classifying the messages. Alternatively, a system can support a hybrid system in which publishers post messages to a topic while subscribers register content-based subscriptions to one or more topics.

In Messaging system 160, a durable subscription to a topic, which stores all messages sent to a topic, can be created to ensure that a publish/subscribe application receives all sent messages, even if there is no client currently connected to the topic. For example, if an application goes offline temporarily and has no consumers on the topic, the client will miss any messages sent to the topic. However, if there is a durable subscription, upon restarting the application, the application will be able to receive any messages sent to the topic (and stored in distributed data grid 100) during the time the application was not running.

Store and Forward Messaging

In general terms a store and forward messaging pattern advocates that: * * Payload, typically represented as a Message object, may be sent to a Destination from a Publisher. It is the responsibility of the infrastructure managing the Destination to ensure that Messages (arriving at the said Destination) are then stored (in some manner) and consequently forwarded (in the order in which they arrived at the said Destination) to one or more Subscribers. The Subscribers appropriately consume (receive and acknowledge receipt) of the said Messages from the Destination in the order in which they were forwarded to the said Subscribers. The infrastructure managing the messages appropriately cleans up (remove and garbage collect) the Messages that have been consumed by Subscribers.

A Topic Destination or as they are more commonly known, Topics, will store and forward Messages to all of the Subscribers of the said Topic. This form of Message delivery is often called "publish and subscribe messaging", or "one to many messaging". A topic is a more exotic form of queue. A topic can have multiple subscribers—each of which subscribers receives every element that was put into the topic. A Queue is essentially a special case of a topic where there is only one subscriber. A typical messaging system will operate a large number of topics simultaneously. For example a system may operate a topic for stock tickers of companies on an exchange with each stock ticker having its own topic.

In store and forward messaging, message ordering is guaranteed for messages having the same unit-of-order. All messages published using having the same unit-of-order will arrive at each subscriber in the same order, however there is no defined ordering for messages having different units-of-order. Consider this example where unit-of-order is specified by threads. If one thread is publishing messages A and B and at the same time, another client thread is publishing messages C and D to the same topic. A subscriber might receive the messages in any of the following orders: A,B,C,D or A,C,B,D or C,A,B,D, etc. Messages A and B will always be received in the order in which they were published. Messages C and D will be always be received in the order in which they were published. But there is no relative order specified for messages C and D relative to messages A and B.

While it's rare that an architecture making extensive use of a distributed data grid, such as Oracle Coherence, will require Store and Forward Messaging (due to the ability to use Live Events, Continuous Queries and events for notifications), there are arguably some circumstances where the topics messaging pattern is particularly useful. For example, the topic messaging pattern is pattern provides a flexible framework for embedded, application-specific, high performance messaging on a distributed data grid. More specifically, this implementation has been designed as a framework to support high performance topics-based store and forward messaging and multipoint (no single point of failure) guaranteed event distribution, typically between multiple distributed computing clusters separated by high latency, high bandwidth and often unreliable wide area networks (WANs).

FIG. 1B illustrates a top level view of the topics messaging function of messaging system 160. As shown in FIG. 1B publishers 152*a*, 152*b* send messages to topic 170 of messaging system 160. The messaging system 160 order the messages into a topic 170 where the messages are durably stored. The messages are stored as values with the distributed data grid 100 (e.g. as values of KVP in Caches 140*a*, 140*b*, 140*c*, 140*d*, 140*e*). The messaging systems maintains metadata and code which allows storage, retrieval and deletion of the messages as further described below. The messaging system typically comprises a large number of different named topics. Publishers include in each message an indicator of the topic to which a message is published. Moreover, each topic may include multiple different channels (as described below). As shown in FIG. 1B, Topic 172 has three channels 173, 174, and 175 for messages.

A subscriber 154*c* of topic 170 consumes/receives each of the messages M1, M2, M3, and M4. Subscriber groups comprises a plurality of subscribers which act in parallel to consume messages from a topic. Subscriber group gets all messages in the topic but members get some fraction of the messages. Members of a subscriber group 180 cooperate to consume messages from the topic. Thus while the subscriber group 180 as a whole is guaranteed to receive every message in the topic. The individual subscribers each process only some of the messages. The messages M1, M2, M3, and M4 are durably stored in the messaging system until consumed by the last interested subscriber/subscriber group, at which point they are deleted.

Paged Topics Implementation

The distributed data grid of FIG. 1A functions primarily as a key/value store. Values are stored in the distributed partitions in memory and retrieved from memory using the key. However, there is no inherent ordering of the key/value pairs. The use of key/value store for a messaging system is thus counterintuitive because ordering is a fundamental requirement of a messaging system. The key question is therefore how to implement the requirements of store and forward messaging paradigm, in particular with respect to ordering in a key/value store.

One simple solution to the ordering problem is to put all the messages for a topic into a linked list in one partition. This allows for ordering of the key/value pairs. However, the solution, because it uses a single partition, fails to take advantage of the properties of the distributed data grid with respect to available memory, processing power, and network throughput. In a distributed system with multiple nodes/servers. For example with a single linked list, both publishers and subscribers are contending for the head and tail of the list. This contention scales with number of clients.

Another simple solution is to identify each successive published message with an ID value set by a counter. The ID value could be hashed to produce a key, and the key and message could be inserted into the distributed data grid. In order to ensure ordering the counter would be a singleton service operating one node of the distributed data grid. While this solution would preserve ordering and also distribute the messages over multiple partitions in the distributed data grid, this solution would also give rise to significant new contention issues. For example, when messages are published, the publisher would have to get the next value from the counter in order to determine how/where to publish the message. Each request for the counter value requires a network round trip, and as more publishers are added, they contend for access to the counter. Likewise on the subscriber side, a counter must be provided to identify the message id to be read. It takes two network roundtrips to get a value of counter (which can be hashed to generate the key) and then try and get the value from cache as indicted by counter. As the number of subscribers goes up—they contend for the counter value. Also, the likelihood increases that the message will have been consumed by another client the subscriber you get there. Accordingly, as the number of publisher and subscribers increases, the efficiency of this solution dramatically decreases. This is undesirable.

In accordance with an embodiment, the present disclosure describes a paged topic implementation. The paged topic implementation makes use of the advantages of the distributed data grid with respect to memory, processing power, and network throughput while at the same time satisfying the ordering requirements of the messaging system.

A page as used herein is a large number of items stored in the same partition. Usually the values V, stored in the messaging system are less than a kilobyte in size. In an embodiment, the default page size is 1 megabyte. Thus a page can typically accommodate a thousand or more entries. Because there are a large number of entries per page, the contention is reduced and access efficiency increased for both publishers and subscribers. Each page is mapped into the partitioned storage using a hash function of the topic name and page number modulo the number of partitions. This means that pages are automatically distributed over partitions. Moreover page locations can be calculated (e.g. by a subscriber or publisher) based on the same hash function of the topic name and page number. Over time the pages are distributed over all the partitions. Each page is conceptually just a linked list but of separate key/value entries in a key/value store. Instead of links being object references, the links include next key reference for next entry in the list. The next key reference allows the next object to be accessed from the key value store.

Using a page mapping based on a hash function of the topic and page number provides an advantage. If one just distributed messages directly over the partitions, filling partition by partition, one would eventually run out of partitions because partitions are fixed in number. This the pages as another layer of abstraction. The number of pages is effectively infinite. A page is a unit assigned to partition—effectively infinite number—can has page onto partitions—balances—reuses—pages are allocated evenly across cluster. The hash function not only distributes the pages over all partitions in the cluster, but also recycles back to partitions as the page count increases. To put it another way, the pages don't run out.

If two publishers both try to publish to the same page, then the second to arrive just appends the message to the bottom of page (no wasted trip). Publishers keep appending messages until the page is filled. In face of contention the system still makes forward progress till the end of page is reached. The pages are sufficiently large (hold a significant number of messages) such that page transitions don't occur too often. When the page is full, a publisher can go back to the page counter (which increases monotonically).

The system needs to maintain page counters for publishers and subscribers. A single tail counter is maintained and used by all publishers to a topic. The tail counter indicates the current page to which to send new messages. Each head page pointer is maintained for each subscriber/subscriber group. This indicates which page the subscriber/subscriber group is receiving messages from. Local information (metadata) in the same partition as the page indicates for the relevant subscriber/subscriber groups what position on the page to read. The head page pointer only increments when a page runs out of entries for a particular subscriber/subscriber group to read.

Moreover, if a subscriber attempts to receive a message from an empty page, it can assume that there is likely data to receive on the next page and automatically attempt to read a message from the next page. Only if that extra read fails does the subscriber return with nothing and look to the head page indicator to update its head location information. Generally this results in avoiding the wasted network roundtrips in reading messages from the paged topic.

A page essentially comprises a linked list of discrete key value pair stored in the same partition. Each entry includes the key which identifies the next entry. All entries on a page are stored in the same partition. Break page contents outside of pages. Ensure the pages reside in the same partition as their page entry. The page entry just maintains the mini queue's local tail.

Figure 2:
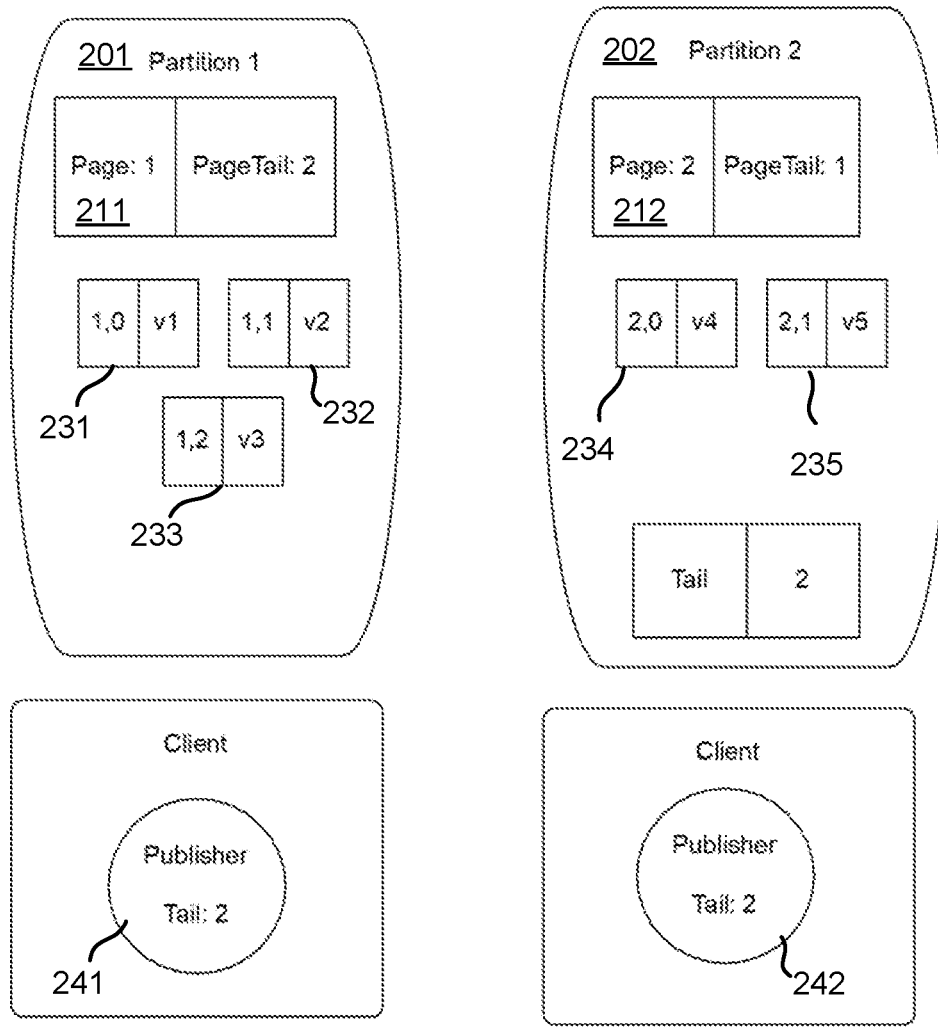
FIG. 2 illustrates an aspect of a paged topics architecture according to an embodiment.

FIG. 2 illustrates a paged topic pattern. In the example of FIG. 2, there are two partitions, partition 1, 201 and partition 2, 202. Page 1 is on partition 1 and page 2 is in partition 2. Each page comprises a metadata file 211 for Page 1 and 212 for page 2. Each page includes a set of linked key/value pairs. KVP 231, 232 and 233 are on page 1 in partition 1. KVP 234, 235 are on page 2 in partition 2. Page 1 is already full, both clients include publishers 241, 242 which include a stored reference to Page 2 such that future messages are published to Page 2.

For each topic, topic metadata is stored in a topic metadata object stored in the cache. All the storage is in normal KVP in partitioned cache. The metadata is very small object (way less than 1 k) and provides enough information to gives enough information for publishers and subscribers to identify the other key/value pairs in the topic. One entry in the metadata identifies the location of the tail page is. The metadata object tells publishers where the end page is such that publishers can append to the end of the topic. Publishers for the most part don't need to visit the page indicator entry because it only changes every so often (at page transitions) and the publisher can proceed to the next page if it arrives at a page which is already full.

Pages have (in an embodiment) a page size limit of 1 MB. When a publisher tries to publish an entry to the page that exceeds the 1 MB threshold, the publishing operation is successful in that the last entry is appended to the page. However, the publisher also puts a marker in the metadata associated with the page to seal the page. This prevents further messages from being appended to the page. Once sealed no more entries are added to the page. The tail pointer metadata is also incremented so the new entries go to the next page.

Typically, publishers and subscribers are applications in the cloud or micro services sending and receiving messages from one another or otherwise sharing information and or events. Clients send in publish jobs as entry processors. The entry processors include logic for performing the publish operation including looking at the metadata to identify where to store the message. Each new message is appended to the end of the last existing page in a topic. A Client class is provided on the client/application side. The client class includes the logic for creating the entry processor from the publish request. When a client wants to publish a message it uses the client class to create the entry processor and pushes the entry processor into the distributed data grid. The entry processor performs the function appending the new message is to the end of the last existing page in a topic thereby publishing it to the topic.

Figure 3:
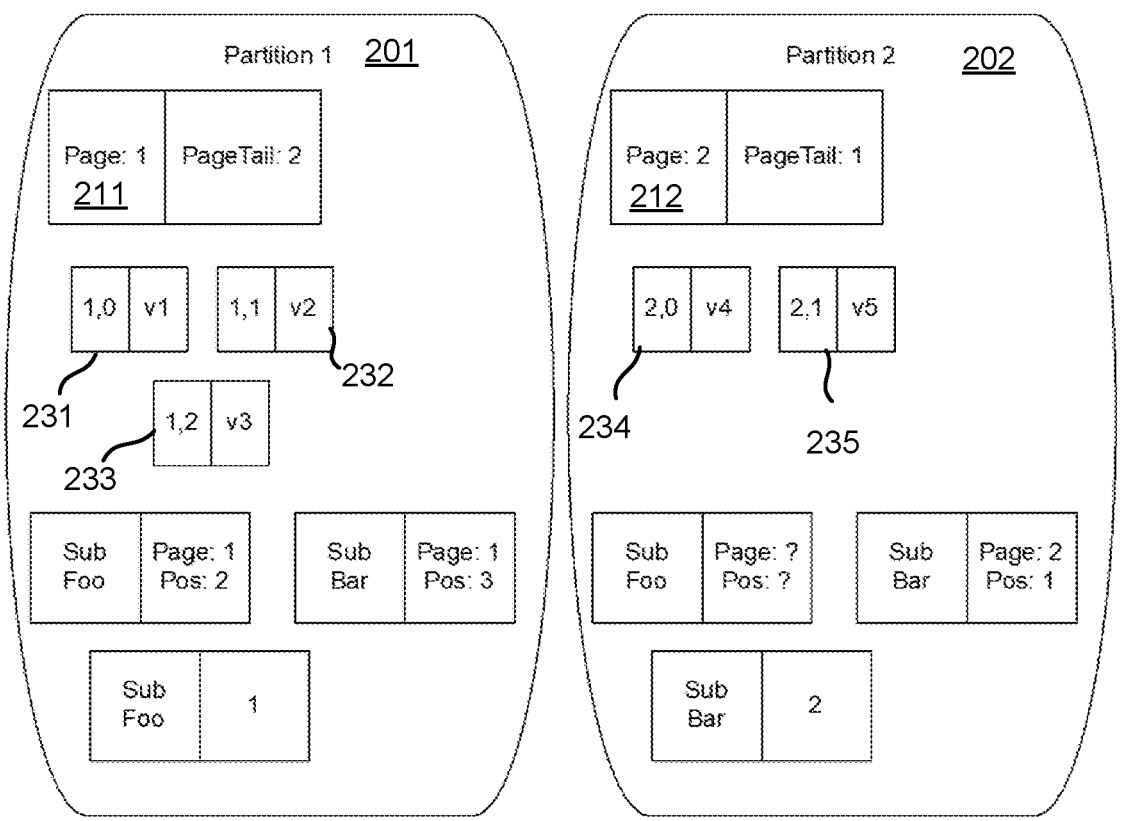
FIG. 3 illustrates an aspect of a paged topics architecture according to an embodiment.
Figure 3:
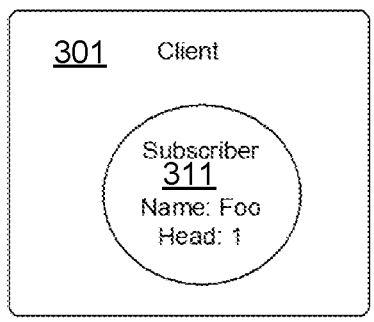
Figure 3:
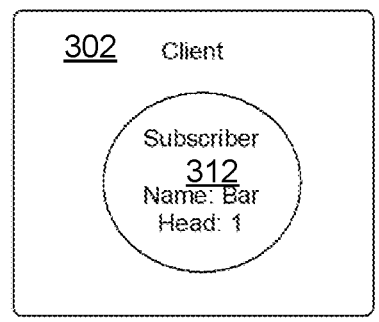

FIG. 3 illustrates how a subscriber or subscriber groups receives/consumes messages from a topic. Topics have multiple consumers i.e. "subscribers". Subscribers can be grouped, or be anonymous. Each subscriber or subscriber group tracks page and position for the next message to be consumed. A single subscriber will consume each message in the topic in order. A subscriber group containing a plurality of member will cooperate to consume each message in the topic in order, however each different members will receive less than all of the messages.

FIG. 3 shows two clients 301, 302 having subscribers Foo 311 and Bar 312. When a subscriber tries to receive an item. First it deserializes an object which is metadata for page 1 for the particular subscriber. Deserializing the metadata identifies which of the values on the page the subscriber should read. For example, the Response=for foo on page 1 your next value is item 4. Then the subscriber can deserialize the entry for value 4 on page 1 thereby receiving the message. It is unnecessary to deserialize all values on page. This ensures that the cost to obtain an item is fixed—and not dependent on number of entries on the page.

When a subscriber is receiving messages, if the subscriber gets to the last entry and the page is sealed the subscriber can determine that it has reached the end of the page. The client receives a response indicating that it should find the new head page from which to consume messages. However, if the page is not sealed then it is clear that the subscriber has reached the last message and there are no messages to consume at this time. The subscriber must wait until a new message is published to the topic.

The paged topic implementation is advantageous for a number of reasons. The publishers/subscriber can almost always go direct to the right node/cache server whether publishing or subscribing. What inefficiencies occur happen only at page transitions and so only $\frac{1}{1000}$ or less attempts. To put it another way, additional subscribing and publishing operations, such as finding the next page or sealing the page, are only required at the page transitions The cost of fetching messages doesn't vary with page size. The cost of fetching messages is only the work of deserializing metadata to identify a Value and then the cost of deserializing the identified value.

Message Deletion Clean-Up

As defined by the topics messaging model, messages must be durably stored until consumed by each subscriber/subscriber group interested in the message. That is, a message can't be deleted until all subscribers that are supposed to receive it have received (or subscriber is destroyed). However the system can't keep all messages forever. Thus, the messaging system needs a mechanism for deleting messages that are no longer required. Moreover, to avoid unnecessary overhead we need to delete messages as soon as possible. This is more complicated than one to one messaging where the single receiver can merely deleted the message at the same time as receiving/consuming it.

How does the system determine when a message can be deleted? The system uses page metadata to determine when a page of entries can be deleted. When a subscriber reads the last item of a page the subscriber can determine whether there are any other subscribers which still need to read the page. If there are no more interested subscribers, the system can delete the page. Moreover the last out subscriber can initiate the page delete task when it leaves the page. In order to allow a subscribed to determine whether a page should be deleted, the page metadata maintains a reference count which indicates how many subscribers are interested in the page. The reference count for a page is initially set to equal the total number of subscribers for the topic plus one (for any preceding page). As each subscriber passes through the page the reference count is decremented. When the last subscriber goes through the page (and if no preceding pages exist) the reference counter drops to zero and the page can be killed. Next page is one of the references to a page. This ensures ordering of page deletions. Don't have to walk other pages/partitions to make delete determinations. Later pages have reference count from preceding page—so can't be deleted till other page goes away. Accordingly a subscriber can use the reference count in the page metadata to determine when to delete a page.

Each subscriber increments the reference count on a page (when subscribing) and decrements the reference count when each subscriber reaches the end of a page—when the reference count gets to zero the page can be deleted delete. It is improper to delete page 2 before page 1. So it is just necessary to maintain ref count on the lowest number page (closest to head of topic) and then push over the reference count to the next lowest page when a page is deleted (e.g. page 1 till page 1 is deleted, then page 2 etc.). This allows the messaging system to essentially operate localized garbage collection of pages such that no centralized garbage collection process is required to delete obsolete pages/messages. The partition local garbage collection is advantageous from a scalability and fault tolerance perspective.

Figure 4:
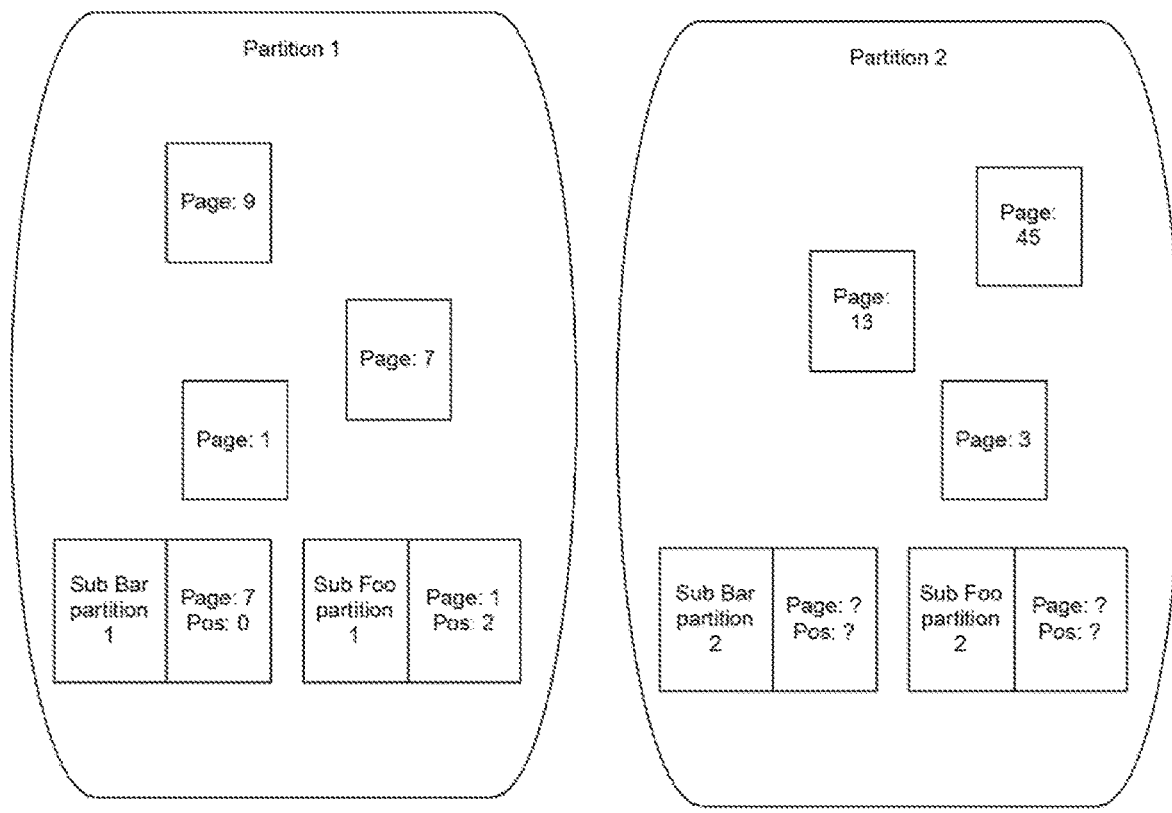
FIG. 4 illustrates an aspect of a paged topics architecture according to an embodiment.
Figure 5:
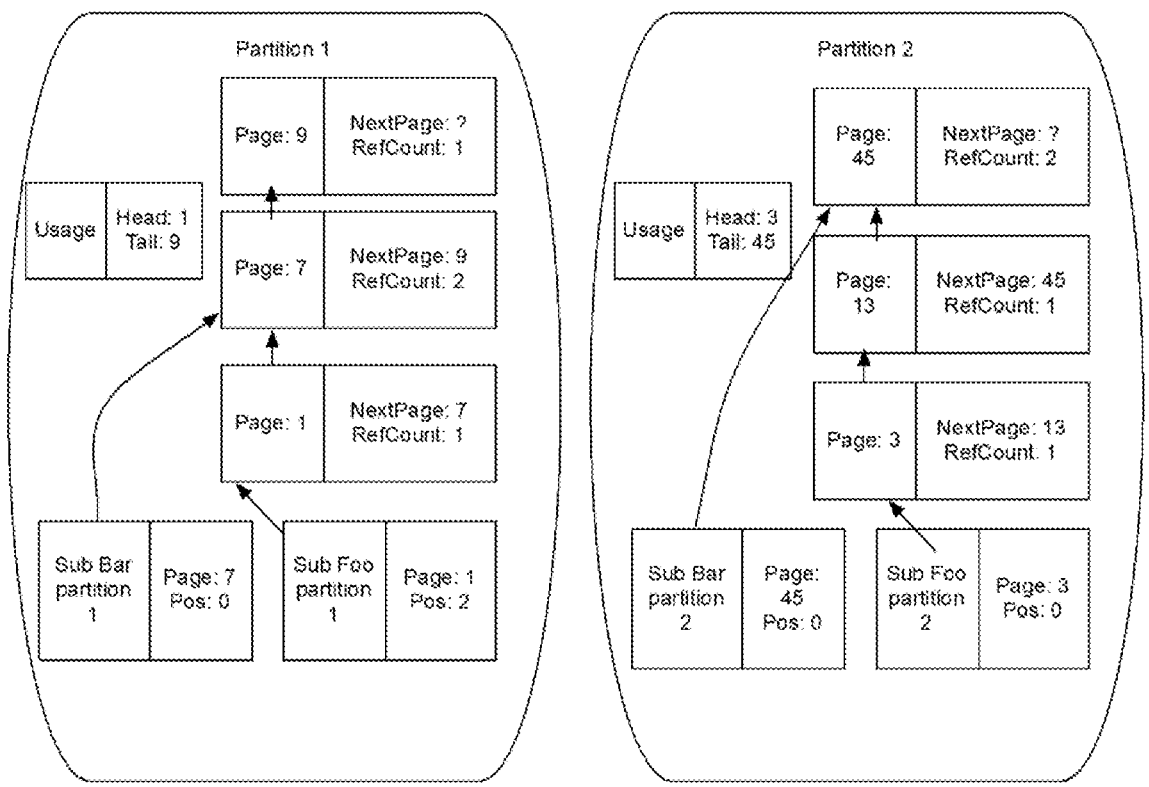
FIG. 5 illustrates an aspect of a paged topics architecture according to an embodiment.

As shown in FIGS. 4 and 5, each page has reference count which indicates number of remaining subscribers plus preceding page. When last subscriber is removed the last subscriber out closes the door and initiates a job to clean up. If last dispatch clean up job. Cleanup is done a page at a time. But pages are randomly spread across partitions. But there is an important relationship between pages in a partition. There is still order even though there may be large gaps. Page N can't be removed before page N-1. Pages can be reference counted starting at subscriber entry and moving through pages within a partition. When a subscriber finishes with a page it decrements the counter, and if 0 can safely remove the page and all its corresponding values.

Unit-Of Order Based Channels

One aspect of scalability is making sure storage is spread across partitions in the distributed data grid. Another aspect of scalability is spreading CPU load. Most load is on the servers holding the head(s) and tail of a topic. This is where CPUs are actually working to respond to publishers and subscribers. Preferably this workload is distributed and more servers are used concurrently.

As described above, a topic might have multiple different units of order. If there are four different UOO, the system can consume them in parallel. The system maps the multiple UOO to different channels. There are a fixed number of channels within topic (some fixed prime number) say 17 channels. Each channel has its own head and tail. Thus, the head and tail workload of each topic can be spread over more nodes. Messages that are ordered with respect to each other always go to same channel. Multiple subscribers in the same subscriber group get fanned out to different channels. Different channels go to different cache servers. This results in more active heads and tails for each topic. For example, 17 channels provides up to 17 active cache servers for head and 17 active cache servers for tails.

Subscribers in same group try to avoid contending with each other. The subscribers in a subscriber group will be assigned to separate channels. The effect distributes work load over the available servers and reduces contention. If a particular channel is empty the subscriber instance will look for another channel from which to consume messages. But if subscriber instance gets to another channels and finds another. Subscriber instance of the subscriber group working, they will get off the channel and keep looking.

Thus where there are multiple UOO, this allows multiple orderings, and this allows the use of multiple channels to scale/distribute work load. Because of paging can use scale of cluster—we ensure even distribution of pages across cluster. A totally ordered topic naturally only scales to two CPUs (head, tail). There likely isn't strict ordering between publishers. Leverage this, i.e. ordering between published items may be loose. Unit-of-order—maps to a channel within a topic Publisher thread by default, configurable. Channels are independent of one another, they don't contend. Scalability is then two CPUs per channel. Topics can have prime (sqrt(partition count)) channels per topic. The scalability advantage is relative to the number of distinct unit-of-order values.

The default option for ordering is ordered by publisher thread. That's is unit-of-order is maintained for each thread publishing messages (but not between differ threads). However, ordering may also be performed by object or value (e.g. company 1 ticker messages are ordered with respect to each other, and company 2 ticker messages are ordered with respect to each other—but there is no relative ordering of the company 1 and company 2 ticker messages.

Distributed Wait/Notify Pattern

Figure 6:
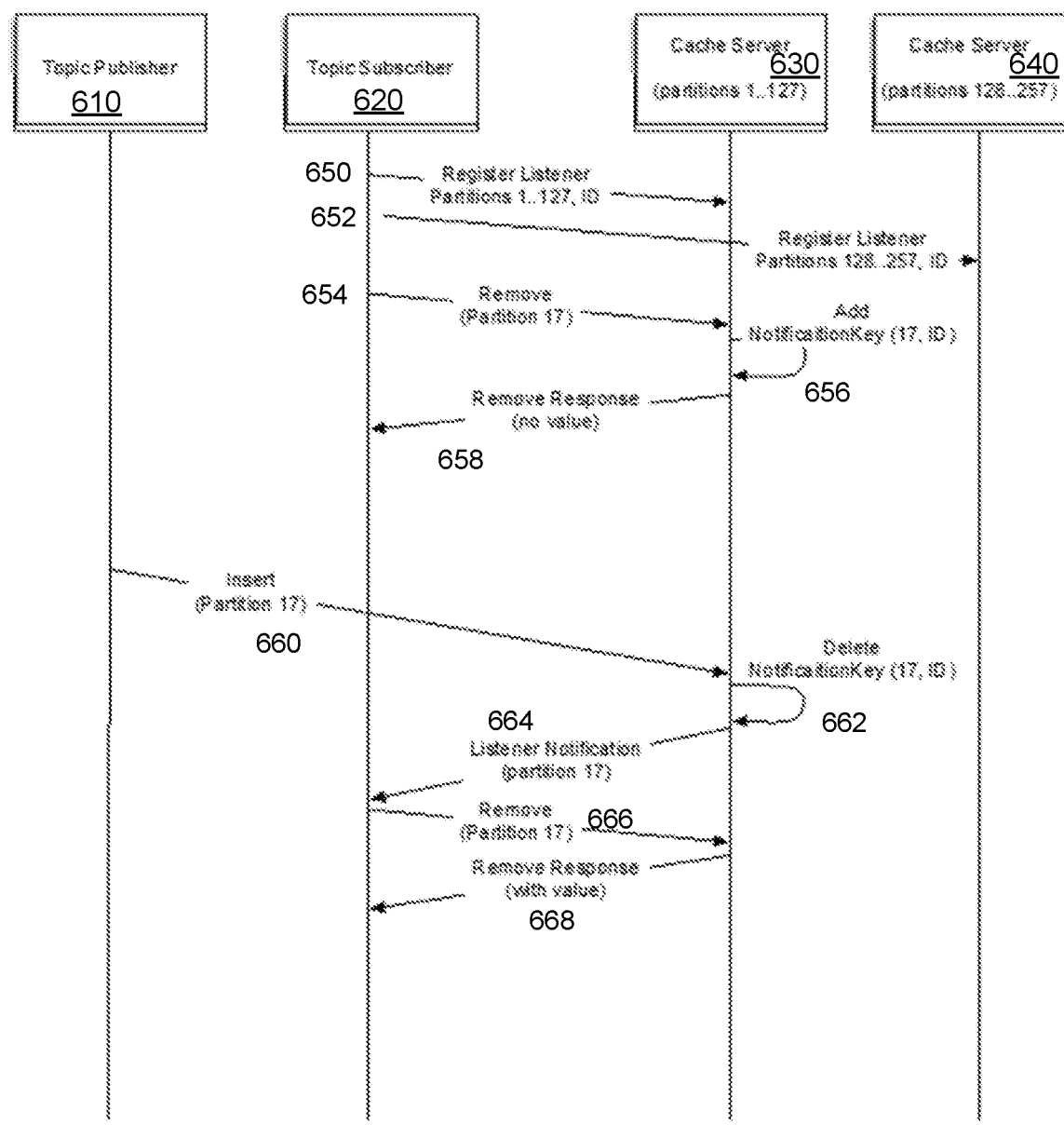
FIG. 6 illustrates a distributed wait notify pattern according to an embodiment.

FIG. 6 illustrates a distributed wait notify pattern according to an embodiment. The wait/notify mechanisms offered by programming language libraries such as Java's Object.wait/notify provide a valuable generic programming tool in which a thread can suspend its execution until a desired condition has been met. When the condition is met the thread will be awoken and can again test for and react to the condition. Such mechanisms replace much more resource costly alternatives such as busy waiting or periodic polling. This embodiment describes how to model the same useful feature in a distributed messaging environment which utilizes a partitioned key/value store which supports entry processors and event listeners.

While the distributed wait/notify pattern described herein has particular utility in the Topics implementation discussed above, the pattern can be easily applied to other distributed data structures mapped onto such key value stores. The wait/notify pattern is described below with particular reference to the topics implementation above.

In Topics, there are two natural points where an application may need to wait, and that is when the topic is either full or empty. For instance, if a receive operation is performed by a subscriber and the topic is found to be empty the application may wish to have the operation suspend and complete successfully only once an item is available for removal. To do this we need a means in which to wait for the topic to become non-empty.

Utilizing the standard wait/notify provided by Java would mean that the system would have to perform the wait at the place where data would arrive, i.e. on the server. This would mean the system would have to consume a thread on the server to perform the wait operation. A server-side thread is considered a limited resource and it is not desirable to consume it for longer than is absolutely necessary. Instead it would be desirable for the client which issued the remove operation to receive a notification once the queue became non-empty.

One way of achieving this notification would be to utilize a key/value listener which can be notified of insertions into the topic data cache. There are however problems with such an approach. If the client were to register the listener only after having found the topic to be empty it would have to follow up the registration with a subsequent removal attempt to ensure that an insertion didn't occur between the initial attempt and the registration. Also, once any successful removal was performed the client would need to perform a corresponding deregistration. There is a fairly high cost in performing registration and deregistration operations, and thus it is desirable to instead retain the registration for the lifetime of the client. The problem with that however is that then the client will be informed of every insertion into the topic, even if it is currently not interested in the event, i.e. because they had no pending remove operations on an empty topic, or perhaps the topic was not even empty. In such a case, every client would likely end up receiving an event for every insertion into the topic and this would result in a very high volume of potentially needless network traffic. Instead we need a mechanism which allows to emulate wait/notify, which allows for only those parties which are waiting to be notified.

The distributed wait/notify pattern described herein solves the disadvantages of the above solutions and increases performance of the messaging system as a result. Upon startup, a topic subscriber instance will compute a random 32-bit integer ID, and all operations performed by that subscriber instance will carry that ID with it. The subscriber also pre-registers an event listener for that ID in a special "notifications" cache for each partition. In order for the ID to have a representation in each partition a special composite key known as a NotificationKey is constructed which includes both the partition ID and the subscriber instance ID, and which utilizes Coherence's Partition-AwareKey interface to mark itself as belonging to the intended partition.

The notifications cache is distinct from the cache used for holding topic data. This cache is keyed by the Notification-Key type and has associated value type is irrelevant. There is also a "metadata" cache which maintains metadata for the topic in question. When a remove EntryProcessor runs against the topic it is invoked against the partition associated with current topic head. If the topic is found to be empty the EntryProcessor takes advantage of the fact that it can locally access other caches within the same partition and it in adds an entry in the notifications cache with a NotificationKey based on the current partition and the subscriber instance ID. It also adds its subscriber instance ID into the metadata entry for the topic within the target partition. This list represents the subscriber instances which wish to be informed when an insertion occurs, i.e. only the "waiting" subscribers.

When a subsequent insertion is performed on the topic the insertion will happen at the same partition, because if the topic were empty, then head and tail are equal. The insertion EntryProcessor checks the metadata entry and evaluates the aforementioned list of waiting subscriber instances. Then it will compute the corresponding NotificationKey(s) and delete their entries from the collocated notification cache, and then clear the list. The deletions from the notification cache trigger deletion events which are sent to the corresponding registered subscriber listeners in the topic client(s).

Because, each subscriber instance computed a random 32-bit ID we are able to ensure that only a minimal set of subscribers are notified. Specifically, every interested subscriber is guaranteed to receive a notification since it had registered a listener for a NotificationKey which was changed (via a delete). Subscribers which weren't interested, i.e. ones which hadn't found the topic to be empty and placed themselves in the list will not receive any notification. Upon receiving the delete event a waiting subscriber will simply re-issue the remove operation and either successfully remove an item or repeat the above process of inserting their NotificationKey again to await another new item if the topic has concurrently once again become empty. Note in the unlikely case that multiple subscribers happen to compute the same random value any non-waiting subscribers will simply disregard the unsolicited event. As there are over four billion possible 32-bit IDs the chance of multiple active subscribers selecting the same ID is very low.

The choice to have the insertion of a new topic value trigger a delete of the NotificationKey entry is deliberate. By performing deletes rather than some other modification it ensures that the NotificationKey state is completely removed from the storage tier at the time a value is added and corresponding notification sent out. Any form of modification would have triggered an event, but the delete has a nice side effect of immediately cleaning out the now unnecessary state. Thus if a subscriber terminates at some point there is not additional work necessary to try to clean up their pending NotificationKeys, they'll simply be deleted during the next topic insertion.

FIG. 6 illustrates steps performed by a Topic Publisher 610 and Topic Subscriber 620 to implement the wait/notify pattern. As shown in FIG. 6, at steps 650, 652 the topic subscriber 620 pre-registers listeners with each cache server 630, 640. If later, the Topic Subscriber 620 attempts to remove a value from 654 an empty topic, it adds a notification key 656 to the relevant cache server and receives a null remove response 658. Later, when the topic publisher inserts a new message into the empty topic 660 the action causes deletion of the notification key 662 and activates the listener registered earlier 664. This wakes up the topic subscriber which can then remove the newly added message and receive the response with the value 668.

Topics API and Flow Control

Publishers and subscribers interact with the messaging system through various application programming interfaces (APIs). The APIs allow the creation and removal of named topics, creation and removal of subscribers. Also creation and removal of subscriber groups. Subscriber groups comprises a plurality of subscribers which act in parallel to consume messages from a topic. Subscriber group gets all messages in the topic but members get some fraction of the messages. As shown below, the Topics APIs include flow control options in order to enhance the efficiency of the system.

The Topics function is accessed through a Topics Application Programming Interface (API). The NamedTopic API allows the creation things which can operate on Topic. These include publishers, subscribers, and subscriber groups. Publishers add messages to a topic and subscriber or subscriber groups consume messages from the topic. As described above, a subscriber group is collection of subscribers which act in concert. The operation of creating a named subscriber implicitly creates a subscriber group (initially having one member but to which other members may be added). The Named Topic API also includes a method for listing all subscriber groups. The NamedTopic API also includes a method for removal of subscriber groups because named subscriber group continues to exist even after all members destroyed—thus need explicit named group removal mechanism.

---

NamedTopic - API
public interface NamedTopic<V>
    extends NamedCollection
    {
    Publisher<V> createPublisher(Publisher.Option<V>... options);
    Subscriber<V> createSubscriber(Subscriber.Option<V>... options);
    void destroySubscriberGroup(String sGroupName);
    Set<String> getSubscriberGroups( );
    }

---

The Publisher API allows publishers to send items to a topic. Send messages in the form of objects of type V. Type V represents a generic object defined by end user. The objects have to be serializable objects in order to be stored in the distributed data grid. The serializer used can be, for example, a standard JAVA serializer, the Portable Object Format serializer or a custom serializer specified by the end user).

Publishing is asynchronous. When the publisher sends an object to the messaging system, the response from the messaging system is a Java completable future. I.E. the publisher receives a response indicating that the messaging system has taken responsibility for performing the messaging task. The publisher can use the completable future to wait to make sure the message publication is complete—where complete means the message is stored durably in distributed data grid. Alternatively, the publisher can attach a continuation to the completable future—e.g. when task is complete perform a follow up action specified in the continuation.

The publisher API also includes a Flush method. This allows the publisher to send multiple messages back-to-back. If for example the publisher wishes to terminate its process—but needs to make sure all messages are stored durably first. The publisher can wait for all completable futures (for each individual message) or use the flush method to get a single completable future that represents completion of all prior work. Flush.get will wait until all work done.

The publisher API also includes a Get flow control method. With an asynchronous API it is possible that a publisher can overwhelm the messaging system with messages. By default the messaging system will let the publishers operate as fast as possible. However if the messaging system becomes backlogged with messages received but not yet durably stored, it will put back pressure on the send function by delaying the return of the completable futures. However this flow control method is unacceptable to some publishers. The Get flow control method allows the publishers to turn off the messaging system flow control and query how much backlog exists in the messaging system. This means that the completable futures will be returned as fast as possible. However the application, aware of the backlog, can moderate its publishing/sending (of messages so as not to overwhelm the system.

```
Publisher API
public interface Publisher<V>
        extends AutoCloseable
    {
    CompletableFuture<Void> send(V value);
    FlowControl getFlowControl( );
    CompletableFuture<Void> flush( );
    void close( );
    }
```

The Publisher Options API provides a range of configuration options for a publisher. The options pushed in on creation of the publisher or can be modified at some later point without modifying the identity of the publisher (i.e. destruction of publisher and creation of new publisher with different options is not required). One option is what the publisher to do on failure to publish? Stop? Terminate? Ignore and try again. Likewise the fail on full option determines whether the system fails when the distributed data grid memory is full of whether the publisher merely holds until memory is available (because older messages have been consumed).

A significant option is the ordering option. The default option for ordering is ordered by thread. That's is unit-of-order is maintained for each thread publishing messages (but not between thread). However, ordering may also be performed by object or value (e.g. company 1 ticker messages are ordered with respect to each other, and company 2 ticker messages are ordered with respect to each other—but there is no relative ordering of the company 1 and company 2 ticker messages. There is also a "None" where no specific ordering is specified. The messages are entered into the topic randomly without any explicit ordering guarantee these allows for fastest processing.

```
Publisher Options - API
public enum OnFailure implements Option
    {
    Stop,
    Continue
    }
public class FailOnFull implements Option
    {
    public static FailOnFull enabled( );
    }
public class OrderBy<V> implements Option<V>
    {
    public static OrderBy<Object> thread( );
    public static OrderBy<Object> none( );
    public static OrderBy<Object> id(int nOrderId);
    public static <V> OrderBy<V> value(ToIntFunction<V> supplierOrderId);
    }
```

Subscriber—API specifies the main method of the subscriber which is the receive method. The receive message (like publish) is asynchronous. When a subscriber calls the receive method it indicates to the messaging system that the subscriber is ready to receive a message. The messaging system returns a completable future. The completable future indicates the messaging system will send a message when available. Thus, the subscriber thread is not held—it returns immediately. The subscriber thread can call ten consecutive receives if it wants ten messages (it doesn't have to wait for messages to be actually received). When the completable future does complete the subscriber receives the message/object which includes V. (User defined object described above).

As with the publish method, the receive message may overwhelm the ability of the messaging system to service receives. Again, the messaging system is, in an embodiment, configured to push back in response to receive backlog by delaying the return of the completable futures. The subscribers can use the get flow control option to avoids any push back on receive.

Additional parameters are available Subscriber options include Name of subscriber group. If there are multiple subscriber instances in a subscriber group, they work together to consume messages. If a subscriber name is specified a group is formed based on the name (which other subscribers can join). If no name is specified, then the subscriber is anonymous and not part of a subscriber group.

The Filter options allows a subscriber to receive only items which match function filter from topic. Filter can be complex as necessary or desired. The filter is evaluated server side. The messaging system thus returns the first message in the topic which matches the filter rather than the first message.

If the topic is empty when a subscriber attempts to consume a message, the subscriber can hold or complete future on empty (and get a null value). If not complete on empty then future won't complete until somebody publishes something. This allows the subscriber to receive a new message when it is published in an efficient manner.

```
Subscriber - API
    interface Subscriber<V> extends AutoCloseable
        {
        interface Element<V>
```

```
    {
    V getValue( );
    }
    CompletableFuture<Element<V>> receive( );
    FlowControl getFlowControl( )
        void close( );
    }
Subscriber Options - API
static class Name implements Option
    {
        static Name of(String sName);
    }
    static class Filtered implements Option
    {
        static Filtered by(Filter filter);
    }
    static class CompleteOnEmpty implements Option
    {
        static CompleteOnEmpty enabled( );
    }
```

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. (See, e.g. "The NIST Definition of Cloud Computing", Special Publication 800-145 (2011) which is incorporated herein by reference.) Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A messaging system comprising:
   a distributed computing environment comprising a plurality of computer systems each comprising a processor and memory and interconnected by a network;
   a plurality of storage nodes operating as a cluster on said plurality of computer systems;
   a distributed cache comprising a plurality of partitions; wherein each of the plurality of storage nodes maintains a separate partition of said plurality of partitions, said separate partition stored in the memory of the f computer system on which said each of the plurality of storage nodes operates;
   a messaging system comprising a topic having a topic name operating on said cluster;
   wherein said topic comprises an ordered plurality of messages stored on a plurality of numbered pages including a topic head page and a topic tail page;
   wherein each particular page of the plurality of pages is mapped to a particular partition of the plurality of partitions using a hash function of the topic name and page number whereby the plurality of pages are distributed over said plurality of partitions of said plurality of storage nodes;
   a plurality of publishers for publishing messages associated with said topic to the topic tail page of said plurality of pages wherein the plurality of publishers are configured to calculate a location of the tail page by performing the hash function of the topic name and page number associated with the tail page; and
   a plurality of subscribers for consuming messages associated with said topic from said plurality of pages.

2. The messaging system of claim 1, further comprising: page metadata stored in said memory and associated with each of the plurality of pages.

3. The messaging system of claim 1 wherein the messaging system comprises a plurality of topics.

4. The messaging system of claim 3 wherein the plurality of topics each comprises a plurality of channels.

5. The messaging system of claim 4 wherein each channel of each topic comprises a head and tail page.

6. The messaging system of claim 1, further comprising: a distributed wait notify system.

7. The messaging system of claim 1, further comprising: a publisher application programming interface configured for flow control.

8. The messaging system of claim 1, further comprising: a subscriber application programming interface configured for flow control.

9. The messaging system of claim 1, further comprising: a partition-local garbage collection process for message deletion.

10. The messaging system of claim 1, further comprising: a unit-or-order system.

11. A method for supporting messaging in a distributed computing environment comprising a plurality of computer systems each comprising a processor and memory and interconnected by a network, the method comprising:
    operating a plurality of storage nodes as a cluster on said plurality of computer systems;
    providing, using said plurality of storage nodes, a distributed cache comprising a plurality of partitions;
    wherein each of the plurality of storage nodes maintains a separate partition of said plurality of partitions in the memory of the computer system on which said each of the plurality of storage nodes operates; operating a messaging system comprising a topic having a topic name on said cluster;
    storing, using the messaging system, an ordered plurality of messages associated with the topic on a plurality of numbered pages including a topic head page and a topic tail page;
    wherein each particular page of the plurality of pages is mapped to a particular partition of the plurality of partitions using a hash function of the topic name and page number whereby the plurality of pages are distributed over said plurality of partitions of said plurality of storage nodes;
    providing a plurality of publishers for publishing messages associated with said topic to the topic tail page of said plurality of pages wherein the plurality of publishers are configured to calculate a location of the tail page by performing the hash function of the topic name and page number associated with the tail page; and providing a plurality of subscribers for consuming messages associated with said topic from said plurality of pages.

12. The method of claim 11, further comprising:
storing page metadata stored in said memory and associated with each of the plurality of pages.

13. The method of claim 11 wherein the messaging system comprises a plurality of topics.

14. The method of claim 13 wherein the plurality of topics each comprises a plurality of channels.

15. The method of claim 14 wherein each channel of each topic comprises a head and tail page.

16. The method of claim 11, further comprising:
providing a distributed wait notify system.

17. The method of claim 11, further comprising:
providing a publisher application programming interface configured for flow control.

18. The method of claim 11, further comprising:
providing a subscriber application programming interface configured for flow control.

19. The method of claim 11, further comprising:
providing a partition-local garbage collection process for message deletion.

20. A non-transitory computer-readable storage media including instructions stored thereon for supporting messaging in a distributed computing environment comprising a plurality of computer systems each comprising a processor and memory and interconnected by a network, which instructions, when executed, cause the distributed computing environment to perform steps comprising:

operating a plurality of storage nodes as a cluster on said plurality of computer systems;
providing, using said plurality of storage nodes, a distributed cache comprising a plurality of partitions;
wherein each of the plurality of storage nodes maintains a separate partition of said plurality of partitions in the memory of the computer system on which said each of the plurality of storage nodes operates; operating a messaging system comprising a topic having a topic name on said cluster;
storing, using the messaging system, an ordered plurality of messages associated with the topic on a plurality of numbered pages including a topic head page and a topic tail page;
wherein each particular page of the plurality of pages is mapped to a particular partition of the plurality of partitions using a hash function of the topic name and page number whereby the plurality of pages are distributed over said plurality of partitions of said plurality of storage nodes;
providing a plurality of publishers for publishing messages associated with said topic to the topic tail page of said plurality of pages wherein the plurality of publishers are configured to calculate a location of the tail page by performing the hash function of the topic name and page number associated with the tail page; and
providing a plurality of subscribers for consuming messages associated with said topic from said plurality of pages.

* * * * *

UNITED STATES PATENT AND TRADEMARK OFFICE
CERTIFICATE OF CORRECTION

PATENT NO. : 10,862,965 B2
APPLICATION NO. : 16/148103
DATED : December 8, 2020
INVENTOR(S) : Falco et al.

Page 1 of 1

It is certified that error appears in the above-identified patent and that said Letters Patent is hereby corrected as shown below:

On the Title Page

On page 2, Column 2, item (56) under Other Publications, Line 5, delete "Hetergeneous" and insert -- Heterogeneous --, therefor.

In the Specification

In Column 10, Line 29, delete "will be always be" and insert -- will always be --, therefor.

In Column 13, Line 33, delete "and or" and insert -- and/or --, therefor.

In Column 14, Line 17, delete "transitions" and insert -- transitions. --, therefor.

In Column 15, Line 58, delete "topic" and insert -- topic. --, therefor.

In the Claims

In Column 23, Line 61, in Claim 1, after "the" delete "f".

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*